Figure 1:
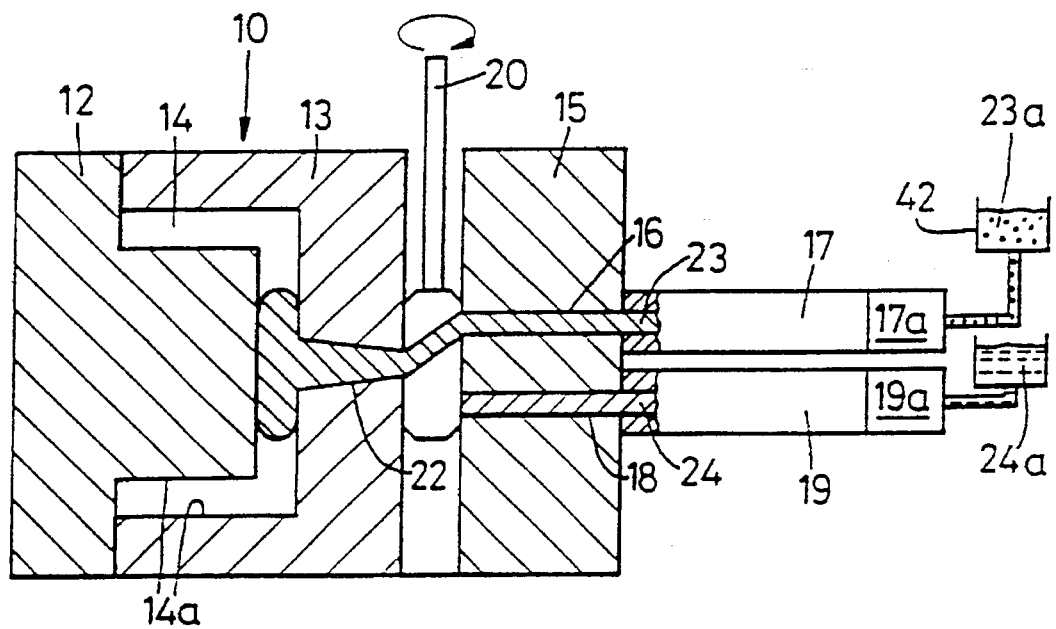

United States Patent [19]
Easterlow et al.

[11] Patent Number: 5,562,979
[45] Date of Patent: Oct. 8, 1996

[54] METHOD OF FORMING A MOULDING BY DUAL INJECTION AND A MOULDING SO FORMED

[75] Inventors: Ronald A. Easterlow, Coventry; Gordon F. Smith, Warwick, both of England

[73] Assignee: Rover Group Limited, Bickenhill, England

[21] Appl. No.: 295,816

[22] PCT Filed: Mar. 4, 1993

[86] PCT No.: PCT/GB93/00453

§ 371 Date: Sep. 2, 1994

§ 102(e) Date: Sep. 2, 1994

[87] PCT Pub. No.: WO93/17855

PCT Pub. Date: Sep. 16, 1993

[30] Foreign Application Priority Data

Mar. 5, 1992 [GB] United Kingdom ............... 9204730

[51] Int. Cl.⁶ ............... B32B 5/16; B29C 45/16; B29C 37/00
[52] U.S. Cl. ............... 428/327; 264/104; 264/512; 264/494
[58] Field of Search ............... 428/327; 264/24, 264/25, 104, 512

[56] References Cited

U.S. PATENT DOCUMENTS 4,681,712  7/1987  Sakakibara et al. .
5,059,361  10/1991  Da Re .

FOREIGN PATENT DOCUMENTS

| 0180383 | 5/1986 | European Pat. Off. . |
|---|---|---|
| 0197830 | 10/1986 | European Pat. Off. . |
| 0412525 | 2/1991 | European Pat. Off. . |
| 2664531 | 1/1992 | France . |
| 6013516 | 1/1989 | Japan . |
| 1-235635 | 9/1989 | Japan . |
| 1305224 | 1/1973 | United Kingdom . |
| 1420948 | 1/1976 | United Kingdom . |
| 2041285 | 9/1980 | United Kingdom . |
| 2080187 | 2/1982 | United Kingdom . |
| 2087299 | 5/1982 | United Kingdom . |

OTHER PUBLICATIONS

Plastics Engineering, Feb. 1991, pp. 27 to 31.
Plastiques Modernes Et Elastomeres, Dec. 1991, pp. 64 to 66 and English translation.
Plastverarbeiter, vol. 29, No. 2, 1978, pp. 66 to 71 and English translation.
Reasearch Disclosure, No. 32969, Sep. 1991.

Primary Examiner—P. C. Sluby
Attorney, Agent, or Firm—Davis, Bujold & Streck, P.A.

[57] ABSTRACT

The method involves providing a powdered or granulated plastics paint material which is heated to a plastic condition to form a plastics coating material and injected into a mould. A plastics substrate material is also injected to spread the plastics coating material over surfaces of the mould so as to envelope the plastics substrate material. A moulding is then produced comprising a substrate having a surface coated by the injected plastics paint material. The method enables a moulding to be produced having a painted surface produced in the mould thereby avoiding the need to apply a subsequent paint finish.

20 Claims, 4 Drawing Sheets

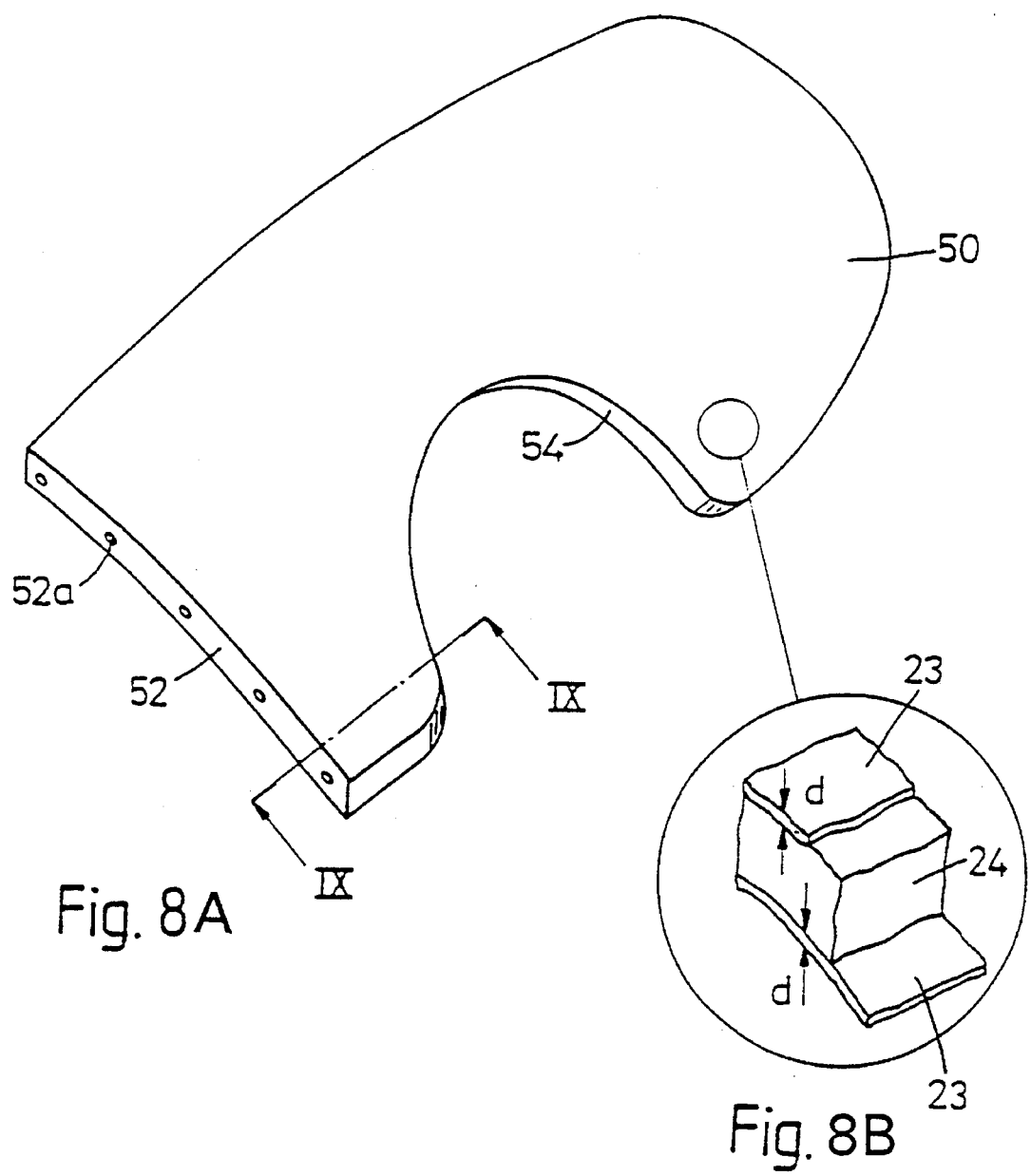
Fig. 8A
Fig. 8B
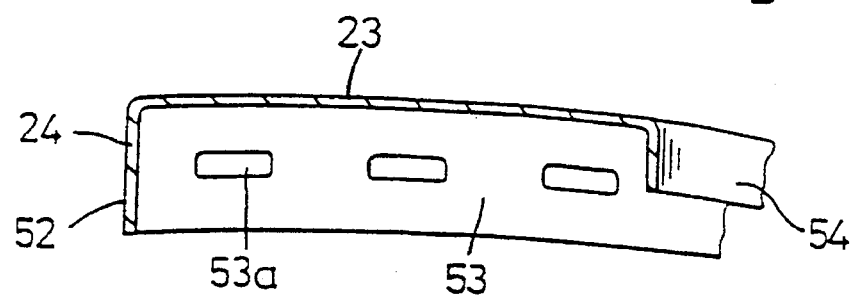
Fig. 9

METHOD OF FORMING A MOULDING BY DUAL INJECTION AND A MOULDING SO FORMED

This is a continuation-in-part of copending International Application No. PCT/GB93/00453 filed on Mar. 4, 1993 and which designated the United States of America.

The invention relates to a method of forming a moulding by dual injection and a moulding formed in accordance with such a method. In particular, but not exclusively, the invention is concerned with the moulding of a vehicle body component in a way which will avoid having to apply a coating of paint to a pre-formed component.

Dual injection moulding is a technique involving injecting a first plastics material into a mould followed by a second plastics material. The injection steps causes the first material to coat the mould surfaces and the second material forms a substrate for the first. The component so formed may harden in the mould prior to removal from the mould.

An example of dual injection moulding is disclosed in GB-A-1,420,948. However any moulding produced by such a method will require subsequent painting outside the mould.

Another example of dual injection moulding is disclosed in GB-A-2 080 187 which describes a method of resin injection moulding (RIM) where a low viscosity liquid resin, for example liquid paint, is injected at low pressure (eg 7 bar) into a mould followed by a higher viscosity liquid resin. The low viscosity liquid resin forms a coating for the higher viscosity resin. Such low viscosity paints take the form of a liquid thermosetting resin having coloured pigments which is injected in its uncured liquid form and subsequently cured. A disadvantage of using a low viscosity liquid resin is that of controlling accurately the spread of the liquid paint to produce a coating of uniform thickness. Therefore such a process is suitable only for the production of primer coats which have to be finished by applying a coat of paint in a conventional manner outside the mould, e.g. by paint spraying.

An increasing number of motor vehicles are now provided with components such as body panels made from plastics materials. For example it has been proposed to form a vehicle body component by initially injecting an unfilled thermoplastics material followed by a glass filled polymer material as a substrate. The unfilled plastics material thereby forms a smooth coating on the substrate ready to receive paint which is subsequently applied by spraying or dipping the cured moulding in a paint facility. We are unaware of any vehicle component being made by such a process which does not subsequently require a finishing paint coating applied outside the mould and the motor industry continues to refine its painting facilities, which in themselves can involve large capital investment and on-going maintenance sums, and present environmental difficulties.

One object of the present invention is to provide an improved method of forming a moulding by dual injection which will render unnecessary the subsequent painting of the moulding or moulded component.

According to one aspect of the invention there is provided a method of forming a moulding by dual injection comprising injecting a plastics coating material into a mould and injecting a plastics substrate material into the mould to cause the coating material to coat a surface of the mould and to produce a moulding having a coating formed by the plastics coating material, characterised by providing the coating material as a powdered or granulated cross-linking plastics paint material and heating the powdered or granulated plastics paint material to a plastic condition for injection into the mould.

The powdered or granulated paint material heated to a plastic condition and applied in that way provides the required paint finish by an in-mould process which dispenses with the need to spray a coating of paint subsequently on to the moulding. Also it has been found that the use of powdered or granulated plastics paint enables a much more controllable flow to be obtained in the mould resulting in a paint coating thickness which is controllable. Thus it is possible with the method of the present invention to obtain a very uniform and consistent paint finish on the moulding. Where this moulding is in the form of, say, a vehicle body panel, such a uniform and consistent finish is most advantageous from a point of view of aesthetics and quality control aspects. Moreover the use of powdered or granulated plastics paint gives a surprisingly good finish uncharacteristic of the "orange peel" effect normally obtained by spray or dip coating a surface with powdered plastics paint.

It is frequently a requirement with vehicle body paintwork that a metallic finish be provided. Typically such a finish is provided by adding metallic or mineral flakes or platelets to the liquid paint sprayed or dip applied to the body component. Spray or dip powder plastic coating is not used to give a metallic finish to vehicle bodywork because the metallic or mineral additives do not orientate in the desired manner and an unsatisfactory finish results. That is due to the fact that the powder coating during melting to form the coating must retain a high viscosity impeding the movement of the additives. However by using a method in accordance with the invention, the injection process produces a flow of paint melt which, when containing such metallic or mineral additives, causes the additives to align or orientate to give the desired effect.

It is preferred particularly to use a powdered or granulated plastics paint of a thermosetting kind which has a thermoplastic phase. In such a case the powdered or granulated plastics paint can be heated sufficiently to bring it to a plastic condition (typically a putty-like condition) in its thermoplastic phase to enable it to be injected at high pressure into the mould (e.g. in excess of 1000 bar). For example heating a powdered or granulated plastics paint to a temperature in the range 80° to 260° C. will normally bring it to a plastic condition for injection into the mould. With such a coating material, the heat absorbed to bring it to the plastic phase may ideally be utilised to cause the material to begin thermosetting, e.g., as it coats the mould or after it has coated the mould following the introduction of the substrate material. In that way a reasonably rapid curing of the coating can be achieved once it has coated the mould. However, if desired, the coating can be cured or curing can be completed after removal of the moulding from the mould, i.e. post cured.

Post curing enables the curing temperature and time to be particularly carefully controlled preferably with a view to creating a strong bond between the two materials.

The paint and substrate materials are preferably selected so as to have an affinity one for the other.

The method may include effecting cross-linking between the moulded coating and substrate material during moulding or during curing of the materials.

According to a second aspect of the invention there is provided a moulding formed by a method according to the first aspect of the invention or any of the consistory clauses related thereto.

The invention also includes a moulding formed by dual injection comprising a plastics substrate material having a plastics coating material thereon, characterised in that the plastics coating material is formed from a powdered or granulated plastics material which has been heated to a plastic condition, injected into the mould and cross-linked to form a cured coating.

Figure 2:
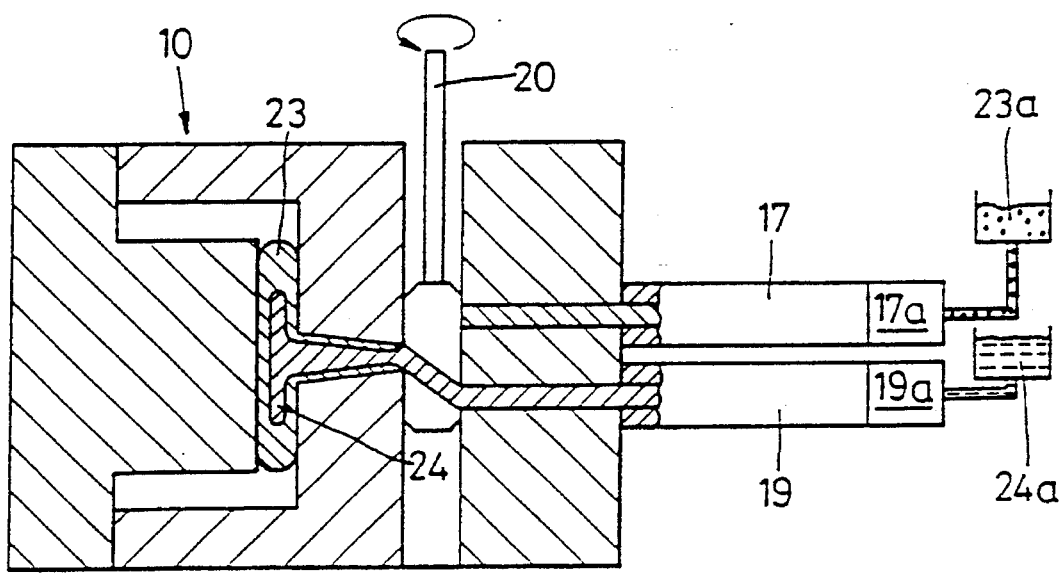
Figure 3:
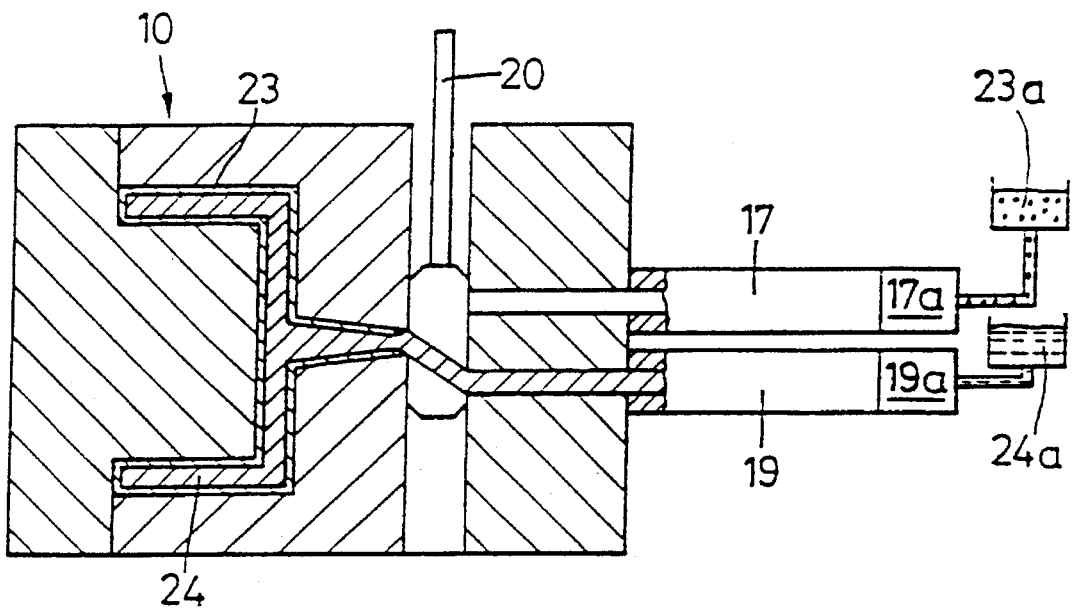
Figure 4:
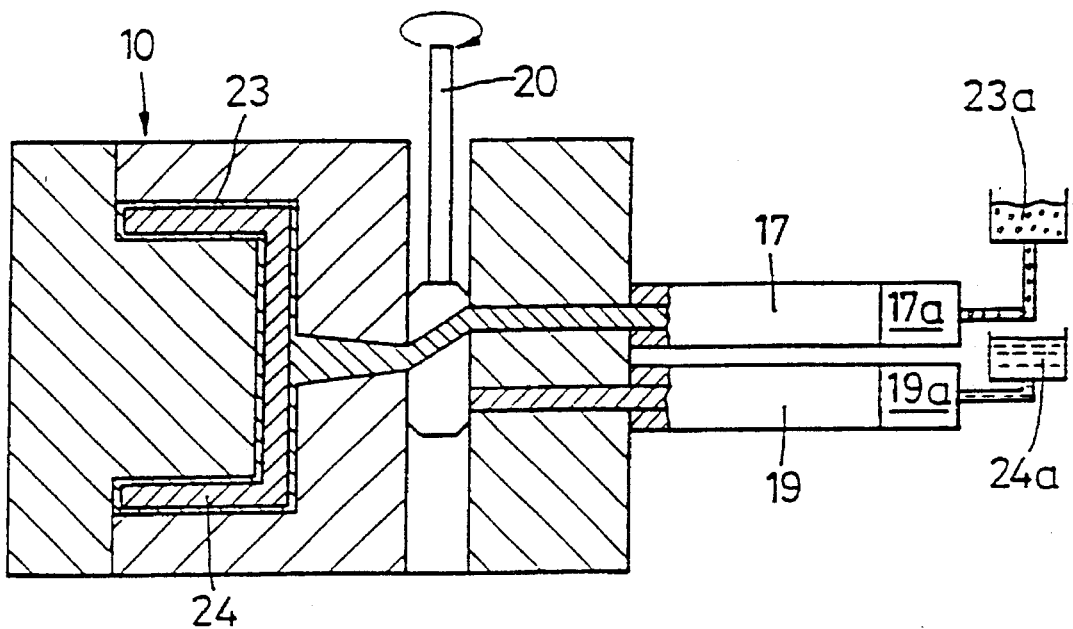
Figure 5:
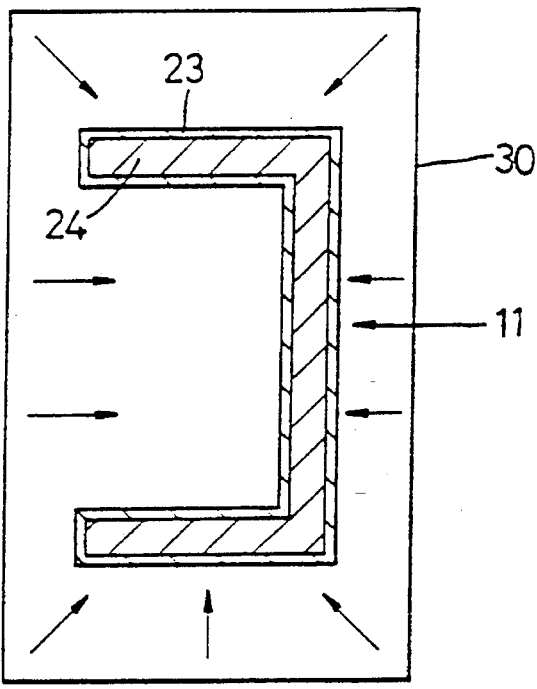
Figure 6:
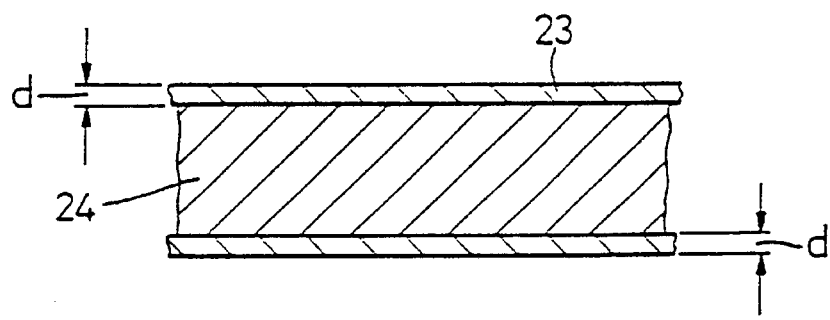
Figure 7:
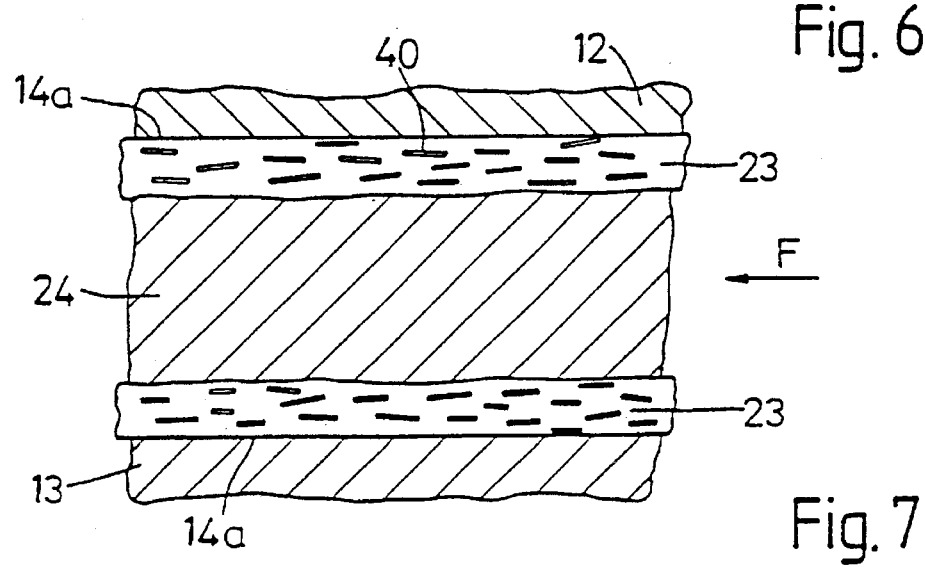

A method of forming a moulding by dual injection and a moulding in accordance with the invention will now be described by way of example with reference to the accompanying drawings in which:

FIG. 1 is a diagrammatic cross section through part of a dual injection moulding machine showing the injection into a mould of a granulated plastics paint material in a plastic condition, FIG. 2 shows the introduction of a substrate material into the mould, FIG. 3 shows the form of the moulding after injection of the substrate material is complete, FIG. 4 shows a second injection of the powdered plastics paint material in a plastic condition to finish off the moulding step, FIG. 5 is a diagrammatic view of the moulding removed from the mould and placed in an oven for post curing the coating, FIG. 6 is a cross section to a larger scale through part of a component made by a method in accordance with the present invention, FIG. 7 is a cross section to a larger scale showing this way in which a paint having metallic effect additives is moulded, FIG. 8A is a perspective view of a vehicle wing in accordance with the present invention and FIG. 8B is an encircled enlargement of a section of the wing in FIG. 8A and FIG. 9 is a cross section of part of the wing of FIG. 8 on the line IX—IX in FIG. 8.

With reference to FIG. 1, the injection moulding machine has a mould 10 having first and second halves 12, 13 defining a hollow cavity 14 therebetween. The hollow cavity 14 communicates with a block 15 which defines a passageway 16 for material from a first extruder 17 and a second passageway 18 for material from a second extruder 19. A rotary valve 20 is positioned between the block 15 and an inlet port 22 in mould half 13 for selection of the material to be injected into the cavity 14.

The extruder 17 is associated with a heater 17a and is operated to deliver a coating material 23 formed by heating thermosetting granulated plastics paint material 23a into a thermoplastic phase in which it takes on a putty-like plastic condition. A suitable granulated plastics paint material has been found to be one which will have a plastic condition at a temperature of around 170° with a putty-like viscosity. One such thermosetting granulated paint material, is Interpon UT 1410 available from Courtaulds Coatings (Holdings) Ltd. of Feliing Gateshead, Tyne and Wear, England which requires post curing after removal of the moulding from the mould cavity.

As shown in FIG. 1, an initial quantity of the coating material 23 is injected into the cavity 14, the mould being at a temperature in a range of, for example, 20° to 100° C. The valve 20 is then rotated to shut off feed of material 23. As shown in FIG. 2, a thermoplastics substrate material 24 such as ABS or nylon 24a is heated in a heater 19a associated with the second extruder 19 and is injected into the cavity 14 behind the injected material 23 as shown in FIG. 2. Injection of the material 24 causes the material 24 to spread the coating material 23 over the mould surfaces 14a defining cavity 14 and injection is continued until the surfaces are coated with the material 23 and the material 23 envelopes the material 24. The material 24 thus forms a thermoplastics substrate or core as shown in FIG. 3 having a coating or skin formed by the material 23.

In FIG. 4, the valve 20 is rotated again to shut off feed from the extruder 19 and to permit injection of coating material 23 into the port 22 so that the machine is ready for another injection cycle.

The heat applied to the thermosetting coating material 23 while it is temporarily in the extruder 17 is absorbed by the material and, once in the mould 10, the heat will begin the curing process of the material. That process may begin as the material is being spread over the mould surfaces by the incoming substrate material or may begin after the injection steps are complete. Preferably, however, the curing of the thermosetting coating material 23 and substrate material 24 will allow sufficient time to enable cross-linking to take place between the two materials thereby ensuring an extremely good bond between them. Instead of a cross-linking occurring between the coating and substrate materials, a good bond alone may be achieved between them due to their intimate contact during injection.

If additional heat is required to cure the thermosetting coating material 23, the moulding (indicated at 11 in FIG. 5) can be removed from the mould 10 and placed in an oven 30. The oven is preheated to a temperature of around, for example 250° C. The moulding 11 is subjected to heat at that temperature as indicated by arrows for a period which is sufficient to cure the coating material 23 but which is insufficient to have a significant softening effect on the bulk of the thermoplastics substrate material 24. It is believed that with careful control of timing and temperature, a good bond will be achieved between the coating material 23 and the substrate material 24.

The substrate material 24 is preferably selected so that it will have an affinity to the coating material 23 and materials such as ABS and nylon constitute suitable substrate materials for such a coating material 23.

The depth d (FIG.6) of the coating material 23 can be selected to be at least as thick as a paint coating which would normally be applied to, say, a car body component in a paint spraying or dipping facility. Also, the injection moulding tool 10 can provide a superfine surface finish for the coating which will compare well with that obtained by spray or dip painting. Moreover, by producing a coating in a dual injection moulding process, the finished coating will be free from contamination by air-borne dust as well as being uniform and consistent. Also, the method is cleaner and more environmentally friendly than producing a finish using a conventional paint facility as the process does not involve extracting contaminated air or effluent from a paint facility into the atmosphere.

If desired, the substrate material 24 can be a thermosetting material instead of a thermoplastics material. The injection steps will be the same as that described above with reference to the drawings except that the mould will be hotter eg at a temperature in a range 100° C. to 180° C. As before, the heat absorbed by the granulated plastics paint 23a to bring it to a plastic condition will lead to the onset of curing and the hot mould will speed up curing of the coating formed by coating material 23. The heat from the mould may also at least partially cure the substrate material 24. If desired the moulding can be left to cure completely in the mould 10 or can be removed for post curing outside the mould, e.g., in the oven 30. In the latter case heat applied to the thermosetting substrate material 24 will not present any distortion problems to the thermosetting materials.

The substrate material 24 may be injected as a foamed thermoplastics/thermosetting material.

In the case where a metallic finish is required, reference is now made to FIG. 7. The granulated plastics paint coating material 23a has metallic or mineral flakes 40 added. The flakes 40 provide a metallic finish in the paint coating. It has been found that as the coating material 23 spreads over the surfaces 14a of mould cavity 14, the spreading or flowing action causes the flakes 40 to orientate themselves so that they lie generally in a plane parallel with the flow or spread direction indicated by arrow F and generally parallel with the plane of the coating formed by the coating material 23. Also the flakes 40 are constrained to lie within the confines defined by the surfaces 14a of cavity 14 so as not to project from the finished paint surfaces of the moulding.

It has hitherto not been possible to achieve a metallic finish using powdered plastics paint coatings. That is due to the fact that the required thickness and viscosity of normal spray/dip powder paint coatings is too great to allow the metallic or mica flakes to orientate in the desired manner. However the method in accordance with the invention produces surprisingly good results when a metallic finish is required in view of the fact that the relatively thin paint layer, together with the effect of flow on the flakes, provides the required orientation for an acceptable metallic finish.

It is envisaged that the method in accordance with the invention can be used to produce by injection moulding various body components of a motor vehicle having a paint finish provided by the coating material 23.

An example of a vehicle body wing in accordance with the invention is shown in FIGS. 8 and 9.

Utilising a mould normally used for the injection moulding of a vehicle front wing 50 for subsequent spray or dip painting after it has been removed from the mould, the mould was positioned on a machine for providing dual injection of plastics material. The two extruders of the machine were supplied with coating and substrate materials 23,24 respectively.

The coating material used was granulated paint heated to a temperature of 190° C. Such heating brought the coating material to its plastic phase enabling it to be injected by its extruder into the mould using an injection pressure of around 1300 bar. The granulated paint was mixed with an additive comprising metallic and mica flakes to provide a metallic finish to the wing 50.

The substrate material 24 was white polypropylene and was heated to a temperature of 230° C. to enable it to be injected by the second extruder at a pressure of 1300 bar.

Using the injection method as described with reference to FIGS. 1 to 4 with the mould heated to a temperature of 60° C., the materials 23, 24 were injected into the mould and the moulded materials were left in situ in the mould for a period of around 90 seconds to allow the materials to cure. The moulded wing 50 was then removed from the mould and inspected.

It was found that the coating material 23 had completely enveloped the substrate 24 leaving no light patches or uncovered areas.

The mould itself did not have mould cavity surfaces of a quality which would enable a high gloss finish to be obtained as wings normally made in the mould were intended for post mould painting by spraying or dipping. Nevertheless, the finish obtained with the moulded plastics paint material was extremely good giving a metallic paint appearance comparable with that normally acceptable on motor vehicle body panels. The moulding demonstrated clearly that a mould cavity having a superfine finish would enable high gloss body panels to be produced by a method in accordance with the invention with no sign whatsoever of the typical "orange-peel" finish characteristic of powder paint coatings.

The depth d of the paint coating material 23 on the polypropylene substrate material 24 could be controlled by varying the quantities of the materials 23, 24 injected into the mould and it was found that the two materials cross-linked well rendering the coating and substrate highly resistant to separation.

The wing 50 was moulded so as to include integral fixing flanges 52, 53 with fastener receiving apertures 52a, 53a therein and a stiffening flange 54. It was found that the paint coating material 23 enveloped the edges of the flanges and the apertures leaving no gaps where the white polypropylene was visible.

It was found that the same results were obtained on repeating the moulding process and with the vehicle front wing selected for the experiment (suitable for use on a Rover Maestro vehicle) it was found possible to provide wing mouldings by a method in accordance with this invention at a rate of one wing every 120 seconds.

The plastics paint material 23a used is of a kind which has hitherto been used in powder form for spray or dip coating of a surface. With spray or dip coating using powder paint, the powder coated surface is subsequently heated so that the powder melts whilst retaining a high viscosity, coalesces and forms a paint finish on the surface. The material is normally produced as a solid sheet of plastics paint which is then ground into a powder or into a granulated form, the latter being the preferred form for use in the method according to the present invention for flowability to the extruder 17 from its hopper 42 although a powdered form may be used.

We claim:

1. A method of forming a moulding by dual injection of a plastics coating material and a plastics substrate material into a mould, the method comprising providing the coating material as a powdered or granulated cross-linking plastics paint material, heating the powdered or granulated plastics paint material and the plastics substrate material to a softened plastic condition in an injection moulding machine, causing the injection moulding machine to inject the softened plastics paint material into the mould and to inject the softened plastics substrate material into the mould whereby injection of the softened substrate material causes the plastics paint material in its softened plastic form to coat a surface of the mould under injection pressure thereby producing a moulding comprising the plastics substrate material having a coating formed by the injected plastics paint material.

2. A method according to claim 1 including providing the powdered or granulated plastics paint material as a thermosetting material having a thermoplastic phase and heating the thermosetting powdered or granulated plastics paint material in the injection moulding machine to bring it to its softened plastic condition for injection into the mould.

3. A method according to claim 2 including heating the powdered plastics paint material to around 80° C. to 260° C. to bring in to its softened plastic condition for injection into the mould.

4. A method according to claim 2 in which the heat absorbed by the powdered or granulated plastics paint material brings it into its softened plastic condition for injection and also causes the plastics paint material to begin thermosetting during the moulding process.

5. A method according to claim 2 including curing the coating formed by the heated powdered or granulated plastics paint material after removing the moulding from the mould.

6. A method according to claim 1 including forming the substrate from a thermoplastics material.

7. A method according to claim 6 including providing the powdered or granulated plastics paint material as a thermosetting material having a thermoplastic phase and heating the thermosetting powdered or granulated plastics paint material to bring it to its softened plastic condition for injection into the mould and applying heat to the surface of the moulding so as to cure the coating formed by the plastics paint material without the applied heat having any substantial softening effect on the substrate.

8. A method according to claim 1 including providing a said powdered or granulated plastics paint material as one which has some affinity to the substrate material.

9. A method according to claim 1 including effecting cross-linking between the moulded plastics coating material and substrate material prior to or during curing of the materials.

10. A method according to claim 1 including providing flake-like additives to the powdered or granulated plastics paint material and utilising a spreading action of the softened plastics paint material during injection thereof into the mould to orientate the flakes so that they lie generally parallel with a direction of the spreading action.

11. A moulding formed by dual injection comprising a plastics substrate material having a plastics coating material thereon, the plastics coating material being formed from a powdered or granulated plastics cross-linking paint material which has been heated to a softened plastic condition in an injection moulding machine, injected by the injection moulding machine into the mould and cross-linked to form a cured coating.

12. A moulding according to claim 11 in which the powdered or granulated plastics paint material is a thermosetting material having a thermoplastic phase.

13. A moulding according to claim 12 in which the plastics coating formed from the injected softened plastics paint material has been cured in the mould using the heat absorbed to bring it to its plastic condition to initiate thermosetting.

14. A moulding according to claim 11 in which the plastics coating formed from the injected softened plastics paint material has been cured after removing the moulding from the mould.

15. A moulding according to claim 11 in which the plastics coating formed from the injected softened plastics paint material is one which has some affinity for the substrate material.

16. A moulding according to claim 11 in which the substrate material is a thermoplastic material.

17. A moulding according to claim 11 in which the plastics coating formed from the injected softened plastics paint material is cross-linked with the substrate material.

18. A moulding according to claim 11 in which the plastics coating formed from the injected softened plastics paint material includes flake-like additives.

19. A moulding according to claim 18 in which the flake-like additives lie generally in a plane parallel with a plane of the plastics coating formed from the injected softened plastics paint material when molded.

20. A moulding according to claim 11 in the form of a vehicle body part.

* * * * *